UNITED STATES PATENT OFFICE 2,340,388

STEROID COMPOUNDS AND A PROCESS OF PRODUCING THE SAME

Hans Herloff Inhoffen, Berlin-Wilmersdorf, and Adolf Butenandt, Berlin-Lichterfelde, Germany, and Erwin Schwenk, Montclair, N. J., assignors to Schering Corporation, Bloomfield, N. J., a corporation of New Jersey No Drawing. Application May 27, 1937, Serial No. 145,052. In Germany May 29, 1936

28 Claims. (Cl. 260—397.2)

The present invention relates to valuable steroid compounds and a process of producing the same, especially of ketones of steroids and of their enol derivatives respectively.

The process of the present invention consists essentially in that ketones of steroids which are polyhalogenated in the ring system are subjected to the action of agents capable of splitting off the elements of halogen hydride, either together, in the form of the acid, or separately in different steps. In the course of this reaction, according to the starting material employed and according to the agents used for splitting off halogen hydride as well as according to the conditions employed various reaction products are obtained.

As starting materials for the process of the present invention may be taken into consideration.

(1) Saturated ketones of steroids dihalogenated in ring A which compounds may be illustrated by the following structural formulas:

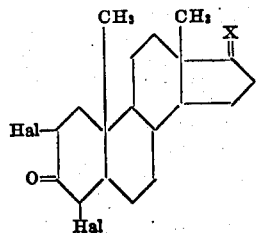

I

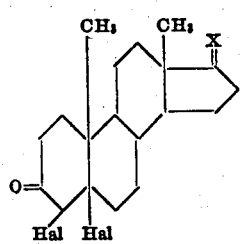

II

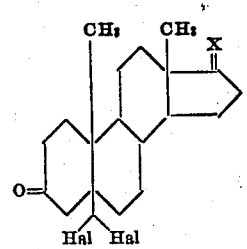

III (2) Saturated ketones of steroids trihalogenated in ring A or in rings A and B which compounds may be illustrated by the following formulas:

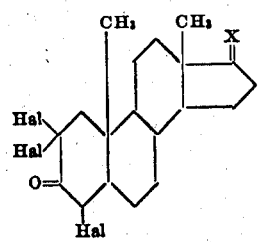

IV

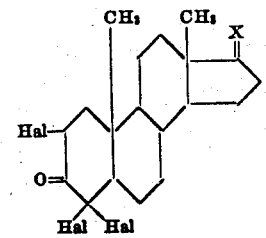

V

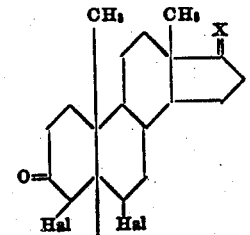

VI (3) Saturated ketones of steroids tetra-halogenated in ring A or in rings A and B which type of compounds may be illustrated by the following formula:

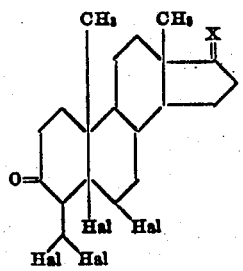

VI (4) Singly unsaturated ketones of steroids polyhalogenated in ring A or in rings A and B which type of compounds may be illustrated by the following formula:

[Formula VIII]

In all these structural formulas X means =O or $$\begin{array}{cccc} H & R & H & R & R \\ OH' & OH' & R'' & R'' & H \end{array}$$

wherein R' stands for a group that, upon hydrolysis, can be converted into the hydroxyl group such as, for instance, the ester or ether group or halogen, whereas R indicates a substituted or unsubstituted hydrocarbon radical.

Instead of the free ketones their condensation products as they are obtained by the action with the usual ketone reagents, for instance, semicarbazide, phenylhydrazine and the like can likewise be subjected to the process claimed.

From the various starting materials the following reaction products can be obtained by treatment with agents capable of splitting off halogen hydride:

(1) The saturated ketones of steroids dihalogenated in ring A yield.

(a) Doubly unsaturated ketones and/or
  (b) Saturated ortho-diketones.

This reaction may be illustrated, for instance, by the following structural formulas:

[Formulas I, IX, Xa, X, III]

(2) The saturated ketones of steroids trihalogenated in ring A or in rings A and B can be converted into unsaturated ortho-diketones during which reaction doubly unsaturated enol derivatives can be formed as intermediate products as may be illustrated by the following structural formulas:

[Formulas VI, XI, XII]

(3) The saturated ketones of steroids tetrahalogenated in ring A or in rings A and B can be converted according to the claimed process into unsaturated ortho-diketones as it may be illustrated by the following structural formulas:

[Formulas VII, XII]

(4) The singly unsaturated ketones of steroids polyhalogenated in ring A or in rings A and B yield likewise unsaturated ortho-diketones during which reaction the corresponding doubly unsaturated enol derivatives can be isolated as intermediate products. The raction proceeds, for instance, according to the following structural formulas:

[Formulas VIII, XI, XII]

In principle, by the process claimed, from the saturated dihalogenated steroid ketones doubly unsaturated monoketones or saturated ortho-diketones are obtained and from the unsaturated dihalogenated steroid ketones singly unsaturated ortho-diketones are formed, during which reactions doubly unsaturated keto enol derivatives may be formed. On the other hand, the tri- and tetra-halogenated steroid ketones yield singly unsaturated ortho-diketones, during which reaction unsaturated keto enol derivatives may likewise be formed.

In order to split off halogen hydride agents such as the alkali metal and alkaline earth metal, silver, zinc and other salts of organic acids, for instance, sodium acetate, potassium benzoate and the like may be used. The dehalogenation treatment with these compounds can be carried out in alcoholic solution. Especially suitable solvents to be employed for these salts are such as boil at relatively high temperature especially butanol and other higher molecular alcohols as well as the acids the salts of which are used for splitting off halogen hydride, such as acetic acid, benzoic acid, isovaleric acid and the like. Instead of these compounds dioxane, acetone and other organic solvents may be used likewise. The dehalogenating agents referred to which are capable of splitting off halogen in the form of halogen hydride as well as of replacing halogen by an acyl radical are especially used in order to produce and isolate the keto enol-esters mentioned in the above structural formulas. Essential for the formation of these enol esters is that the reaction is carried out in an approximately neutral medium as otherwise by-reactions may take place.

When steroid ketones having a keto group at the carbon atom 3 and two halogen atoms in the ring system are treated with the alkali metal, alkaline earth metal or silver salts of such organic acids as yield easily saponifiable esters, for instance, with the alkali metal acetates and other salts of low molecular aliphatic acids it is possible besides other products to produce and isolate saturated diketones. The formation of these saturated diketones is especially promoted by causing the dehalogenating agents to react on the starting materials at relatively high temperature for a longer period of time. One may also proceed in such a way that first the acyl compounds of the unsaturated oxy-ketone is produced which then is subjected to the action of hydrolysing agents. By this two-step process especially high yields are obtained.

Particularly valuable compounds are obtained by treating with these dehalogenating agents such steroid ketones polyhalogenated in ring A and containing a keto group at the carbon atom 3 as possess at least one halogen atom at the carbon atom 2. During this reaction one halogen atom is split off in the form of halogen hydride whereby a carbon to carbon double bond is formed, whereas another halogen atom is replaced by the corresponding acyl radical. This acyl radical further on can be eliminated by thermal treatment whereby a 2.carbon to carbon doubly bond in ring A is formed. Enol derivatives of these double unsaturated steroid ketones, such as their inorganic or organic enol esters or ethers are obtained by treating these compounds with enolising agents, for instance, with acylating agents, such as acid anhydrides or acid halides or mixtures of the same or acid anhydrides in the presence of salts of the corresponding acids, if necessary while warming.

As dehalogenating agents also ammonia or more suitably organic bases may be used. Particularly suitable has proved pyridine and piperidine. The reaction, however, can also be carried out with other bases such as quinoline, aliphatic or aromatic amines, such as dimethyl amine, diphenyl amine, dimethyl aniline, and the like. The dehalogenating treatment is carried out in such a manner that the halogenated ketones are warmed or refluxed respectively with these preferably water-free bases eventually in the presence of a suitable solvent. By the addition of substances which are capable of combining with the halogen hydride split off without reacting with the starting material, for instance, by the addition of calcium carbonate and the like, the isomerising and polymerising effect of free halogen hydride when present can be diminished.

Besides the reaction products mentioned above by this treatment in a more or less large quantity by-products can be isolated which contain nitrogen. On cooling, some of the nitrogen containing products formed separate in form of crystals on account of their relatively low solubility and can be isolated from the reaction mixture. On thermal decomposition of these nitrogen containing compounds, the chemical constitution of which is not yet determined, the nitrogen containing group can be split off.

The treatment with organic bases particularly with pyridine is especially suitable for the dehalogenation of saturated steroid ketones dihalogenated in ring A; in the case of the other starting materials the salts of organic acids are suitably applied.

Furthermore, especially valuable compounds are obtained by treating such steroid ketones containing a keto group at the carbon atom 3 and halogenated in ring A as possess at least one halogen atom at the carbon atom 2 with organic bases especially with pyridine. By this reaction two carbon to carbon double bonds are introduced into ring A. Instead of the above mentioned agents used for splitting off halogen hydride the following modes of procedure may be applied, especially when such steroid ketones containing a keto group at the carbon atom 3 and polyhalogenated in ring A are used as contain at least one halogen atom at the carbon atom 2:

(1) The replacing of halogen by the hydroxyl group with subsequent splitting off of water, and (2) the replacing of halogen by ester- or ether-radicals with subsequent saponification and elimination of water.

As starting materials for the processes claimed the following compounds may serve which are arranged according to the above given disposition:

(1) Saturated steroid ketones dihalogenated in ring A, for instance, the 2,4-dibromo-cholestanone-3, the 4,4-dibromo-coprostanone-3, the 5-chloro-4-bromo-cholestanone-3, the 2,4-dibromo-androstandione-3,17 and similar compounds.

(2) Saturated steroid ketones trihalogenated in ring A or in rings A and B, for instance, the 4,5,6-tribromo-cholestanone-3, the 2,2,4-tribromo-cholestanone-3, the 2,4,4-tribromo-coprostanone-3 and similar compounds.

(3) Saturated steroid ketones tetrahalogenated in ring A or in rings A and B, for instance, the 4,4,5,6-tetrabromo-cholestanone-3 and similar compounds.

(4) Singly unsaturated steroid ketones polyhalogenated in ring A or in rings A and B, for instance, the 4,6 - dibromo-$\Delta_{4,5}$-cholestenone - 3 and similar compounds.

Instead of these compounds of the cholesterol and coprosterol series other corresponding polyhalogenated compounds of sterols, for instance, of stigmasterol, sitosterol, phytosterol, cinchol and the like, may be subjected to the claimed processes. The halogenated ketones of the degradation products of these sterols are likewise suitable, for instance, the corresponding compounds of the androstane- and pregnane-series as well as the cholanic acids and their lower homologues, the nor-cholanic and bisnor-cholanic acids and the like as far as they represent polyhalogenated ketones of the cyclopentano polyhydro phenanthrene series.

The production of these starting materials can be carried out in various manners. For instance, the singly unsaturated dihalogenated steroid ketones of group 4 of the above disposition can be obtained e. g. by splitting off from the known tribromo-cholestanone or similar compounds one mol of halogen hydride by careful treatment with potassium acetate in alcohol. Such compounds can also be produced by direct bromination, for instance, of cholestenone or other steroid ketones containing a carbon to carbon double bond.

These starting materials can furthermore be obtained by directly subjecting enolesters of cholestenone and of other $\alpha,\beta$-unsaturated ketones containing the sterol nucleus to a halogenating treatment. By splitting off the ester group unsaturated ketones of the cyclopentano polyhydro phenanthrene series polyhalogenated in the ring system are directly obtained which are identical with the above mentioned starting materials. Instead of the esters the corresponding ethers may be used likewise.

The claimed process may be illustrated, for instance, by the following structural formulas which relate to cholestenone in the form of its enol-acetate or to the enol-acetate of androstendione respectively without limiting the invention thereto. Other keto compounds can also be subjected to the claimed process which likewise contain the sterol nucleus and a carbon to carbon double bond in $\alpha,\beta$-position to the keto group.

I.

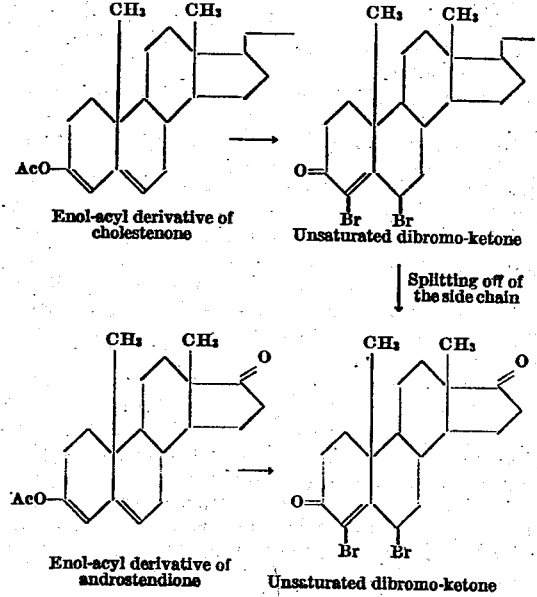

Steroid ketones containing a keto group at the carbon atom 3 and polyhalogenated in ring A as, for instance, the 2,4-dibromo-cholestanone-3 are already known. The hitherto unknown ketones of the androstane- and pregnane-series containing a keto group at the carbon atom 3 and polyhalogenated in ring A which ketones contain at least one halogen atom at the carbon atom 2 and one or more halogen atoms at the carbon atoms 2 and/or 4 can be produced by dissolving 3-keto-androstane or 3-keto-pregnane compounds or their enol derivatives in an organic solvent such as ether, chloroform, glacial acetic acid, benzene, acetic acid anhydride and the like and adding a calculated amount of halogen thereto, for instance, of bromine, chlorine, chloro-iodine in liquid or gaseous state or dissolved in an organic solvent such as mentioned above. According to the reactivity of the ketone used the process may be carried out while warming or while cooling. Furthermore the amount of halogen to be applied may be added at once or successively, if desired while stirring. The reaction can also be carried out in the presence of a catalyst such as halogen hydride, iodine and the like or in the presence of agents capable of neutralising or buffering acids, for instance potassium acetate, calcium carbonate and/or under irradiation, for instance with normal, ultra-violet or ultra-red light.

Particularly practicable has proved a mode of procedure wherein the corresponding amount of a bromine solution in glacial acetic acid is added while stirring vigorously to the substance dissolved in chloroform, after the addition of concentrated hydrobromic-glacial acetic acid solution. Suitable as starting material for the process of the present invention are all compounds of the androstane- and pregnane-series which correspond to the following structural formula:

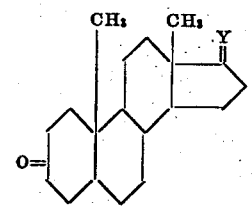

In this formula Y represents one of the following groups:

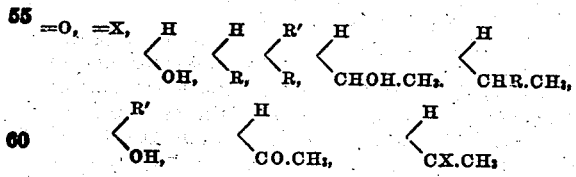

wherein R stands for a group that, upon hydrolysis, can be converted into the hydroxyl group, for instance, the ester group of an inorganic or organic acid and ether group or the like, while R' stands for a hydrocarbon radical and X represents a radical which is formed by condensation of a keto group with a ketone reagent such as hydroxyl amine, semicarbazide and the like.

The derivatives of these ketones which are enolised at the carbon atom 3 may likewise serve as starting materials.

The claimed process may be illustrated with respect to the androstandione-3,17 by the following structural formulas:

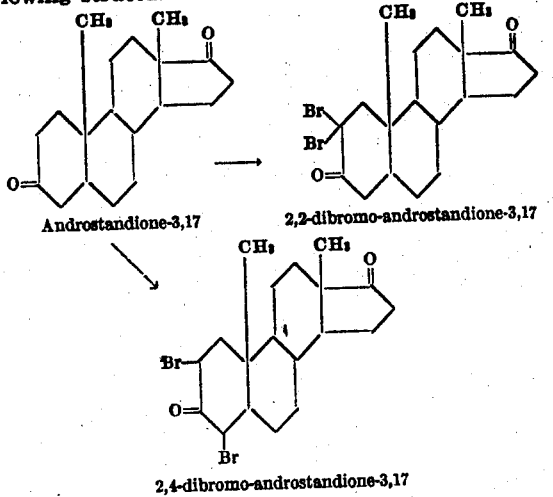

Other polyhalogenated 3-ketones of the androstane- and pregnane-series are obtained by adding halogen hydride at the carbon to carbon double bond of unsaturated 3-hydroxy compounds, converting the hydroxyl group into a keto group and finally introducing one or more further halogen atoms into the molecule of the keto compounds according to the above mentioned process.

As starting materials for this reaction compounds of the following structural formulas may serve:

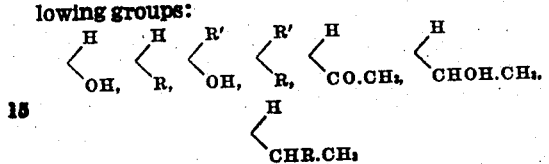

or

In these formulas Y represents one of the following groups:

$$\begin{matrix}H\\OH\end{matrix},\ \begin{matrix}H\\R\end{matrix},\ \begin{matrix}R'\\OH\end{matrix},\ \begin{matrix}R'\\R\end{matrix},\ \begin{matrix}H\\CO.CH_3\end{matrix},\ \begin{matrix}H\\CHOH.CH_3\end{matrix}$$

$$\begin{matrix}H\\CHR.CH_3\end{matrix}$$

wherein R indicates a group that, upon hydrolysis, can be converted into a hydroxyl group, for instance, an ester or ether group or the like and R' stands for a hydrocarbon radical.

The reactions may be illustrated with respect to the Δ5,6-androstenol-3-one-17 by the following structural formulas:

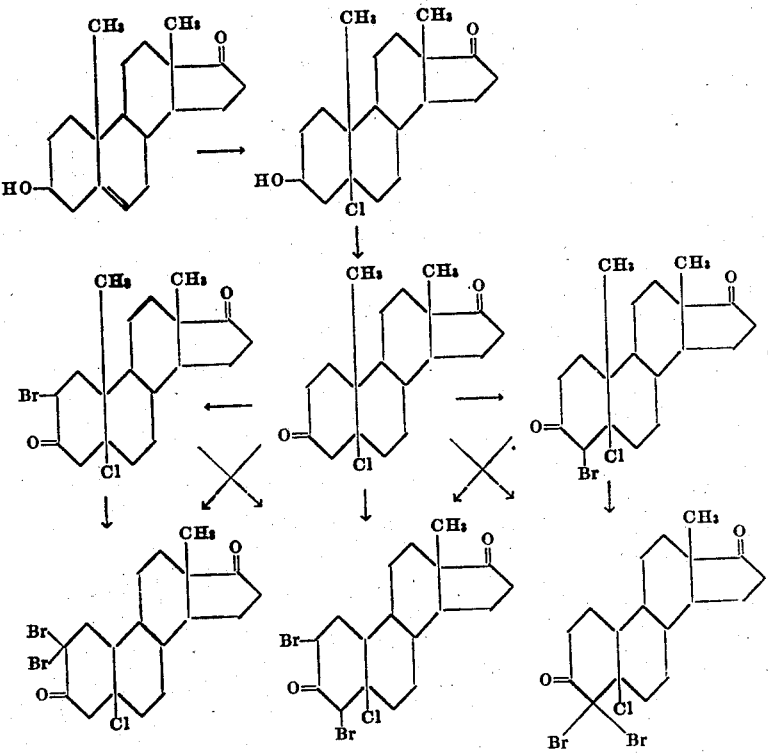

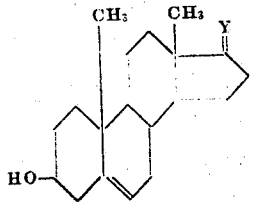

The first step of the reactions of the present invention, the addition of halogen hydride can be carried out in a manner known per se by subjecting the starting material, which suitably is dissolved in an organic solvent, to the action of halogen hydride. The halogen hydride may be introduced into the solution in gaseous state and suitably in waterfree condition. Solutions of halogen hydride in a suitable solvent, such as glacial acetic acid, however, may be used likewise. The monohalogenated compounds obtained can be removed from the reaction mixture and purified before they are subjected to the second step of reaction. They can, however, be worked up also directly without being purified.

The oxidation of the hydroxy group in the 3-position is carried out according to the known methods of oxidising secondary alcoholic groups into keto groups. Suitably, chromic acid anhydride in glacial acetic acid solution is used at room temperature.

The further halogenating treatment can now be carried out according to the process described above, whereby according to the amount used either di-, tri-, or still higher halogenated diketo compounds of the androstan- or pregnan-series are obtained.

This reaction may also be used in order to convert other steroids than those of the androstan- and pregnan-series into the corresponding 3-keto compounds polyhalogenated in ring A.

The reactions claimed may be further illustrated by the following examples without, however, limiting the invention thereto.

hydroxy-ketones as they are obtainable, for instance, as intermediate products on treating 2,4-dibromocholestanone-3 with potassium benzoate in toluene and butanol, the enol-derivatives of these compounds, such as the esters, ethers or halogenides can be employed for carrying out the further reactions. For this purpose these enolic derivatives are subjected, for example, to the action of those agents by which further double bonds are introduced into the ring A. This reaction step can be performed, for instance, by splitting off the secondary ester- or ether group.

The reactions referred to may be illustrated by the following structural formulas:

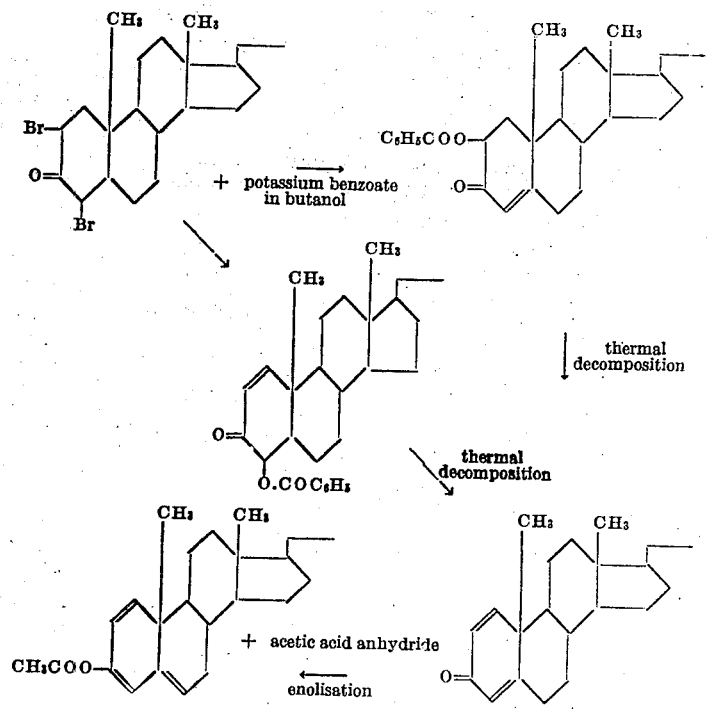

EXAMPLE 1

4 g. 2,4-dibromocholestanone-3 of M. P. 141°, obtained, for instance, according to Dorée, Journ. Chem. Soc. 95, 648 (1909), are mixed with 6 g. potassium benzoate in the mixture of 20 ccs. toluene and 50 ccs. butanol and boiled under reflux for one hour. Thereupon the reaction mixture is diluted with water and extracted with ether. The ethereal solution is evaporated in vacuum to dryness and the residue is recrystallised from chloroform-alcohol. Fine needles are obtained which melt at 177° to an opaque liquid which becomes clear at 216°; the compound has the formula $C_{34}H_{48}O_3$. 0.5 g. of this benzoate are distilled during two hours at a temperature of 220° at a pressure of 2 mm. Hg, whereby benzoic acid is split off. Thereupon the remaining product is distilled for one hour at a temperature of 220° at a pressure of 0.05 mm. Hg. The distillate is taken up with ether and the ethereal solution is washed with sodium carbonate solution and water. After evaporating the ether the doubly unsaturated ketone is obtained in the form of a yellowish oil which can be further purified.

Instead of the mono-esters of the unsaturated

EXAMPLE 2

2 g. 2,4-dibromocholestanone-3 of M. P. 197°, obtained, for instance, according to Dorée, Journ. Chem. Soc. 95, 648 (1909) are heated to boiling with 3 g. potassium benzoate and 20 ccs. isovaleric acid for 20 minutes, whereby potassium bromide is rapidly precipitated. Thereupon the reaction mixture is diluted with ether and the ethereal solution is washed with potassium hydroxide solution. After washing with water the ether is evaporated and the residue taken up with alcohol. After standing for some time crystallization occurs. The isovaleric acid ester is filtered off and repeatedly recrystallised from alcohol; it has the composition $C_{32}H_{52}O_3$. On heating in a capillary tube, it sinters at 102°, begins to melt between 118–127° and yields a clear liquid at 144°; from 127–144° the known coloration of the sterol esters is observed.

The conversion of this ester into a doubly unsaturated ketone can be carried out in the same manner as described in Example 1.

EXAMPLE 3

250 g. 2,4-dibromocholestanone-3 (M. P. 197°) are dissolved in 1 litre toluene; to the solution 3 litres butanol and 250 g. potassium benzoate are added. The mixture is boiled under reflux for 2½ hours in a glycerol bath at a bath temperature of 130–140°. The cooled solution from which potassium bromide and benzoic acid are precipitated, is washed in a separating funnel after the addition of a large quantity of ether, twice with 10% sodium carbonate solution and three times with water. Thereupon the solution is treated with sodium sulphate and evaporated to a large extent in vacuum at 80° until ample crystallization has occurred. After cooling the crystals are filtered off and washed with alcohol; yield 105 g., M. P. of the crude product 135–145°. After fractional recrystallization from chloroform-alcohol for five times a difficultly soluble fraction in the form of fine silky needles can be separated which melt at 176–177°. The liquid becomes clear at 216–217°; yield 35 g.

This product is identical with the unsaturated benzoate of the composition $C_{34}H_{48}O_3$, obtained according to the same process from 2,4-dibromocholestanone-3 of M. P. 141°.

From the combined mother liquor of the product of the melting point 176–177° by diluting with water a more easily soluble crystalline fraction can be separated which melts after recrystallization from chloroform-alcohol at 137–138° (coloration while melting); yield 50 g. This product represents an isomeric benzoate of the formula $C_{34}H_{48}O_3$ (Formula Xa). The splitting off of the acid radical from the unsaturated benzoate of the M. P. 176–177° and from that of M. P. 137–138° is carried out in the same manner as described in Example 1.

Example 4

0.5 g. 2,4-dibromocholestanone-3, obtained, for instance by brominating cholestanone in ether-acetic acid solution with 2 mols of bromine with the addition of hydrogenbromide at low temperature or according to Dorée, Journ. Chem. Soc. 95, 648 (1909), are mixed with 5 ccs. of pyridine and the solution is heated to boiling for one hour. Already after about 15 minutes crystallization occurs. After cooling the reaction mixture the crystals are filtered off and washed with ether. By recrystallization from alcohol-water fine crystals are obtained which have the composition $C_{32}H_{49}ONBr$ and decompose at 322°.

1.1 g. of this pyridine condensation product are distilled for two hours at a temperature of 180–200° and a pressure of 6 mm. Hg, whereby the pyridine component is sublimated. Thereupon the distillation is continued for two hours at 200–220° and a pressure of 0.005 mm. Hg; a yellow oil is obtained which is taken up with ether. The ethereal solution is repeatedly washed with 5% potassium hydroxide solution in order to remove acid constituents. After further washing with water, by evaporating of the ether a light colored oil is obtained from which an unsaturated ketone can be isolated.

Example 5

600 g. 2,4-dibromocholestanone-3 are dissolved in 2 litres of pyridine and the solution is boiled under reflux for 8 hours in a glycerol bath at a bath temperature of 135°. Thereupon the pyridine is evaporated in vacuum on the waterbath and the residue treated with ether and water. While the cholestadienone-3 formed passes into the ether, a large amount of water soluble pyridine compounds remains in the aqueous layer; the latter are extracted with chloroform in an extraction apparatus after the addition of sodium carbonate in excess in order to neutralize the hydrobromic acid. Besides, crystals of the (brompyridyl)-cholestenone-3 being insoluble in ether and water are separated as intermediate layer.

After separating the aqueous layer, filtering off the crystalline intermediate layer and washing the ethereal solution with water the ethereal extract is evaporated to dryness. The ether soluble portion represents a dark colored oil; yield 120 g. From the oil after standing for some time and after the addition of a little alcohol crystals slowly separate. When no further crystallization occurs the crystals are filtered and washed with methanol; crude yield 10 g. In the separated mother liquor (110 g.), which represents the major portion of the reaction product, there is contained the $\Delta_{1,2;4,5}$-cholestadienone-3. After repeated recrystallization from alcohol-water, once with charcoal, the obtained crystals melt at 110–111°.

6.2 g. of this material which still gives a weakly positive Beilstein-reaction are heated to boiling for 15 minutes with 1 g. potassium acetate in 70 ccs. isovaleric acid in order to remove the residual halogen. The reaction mixture is taken up with ether and the ethereal solution washed with diluted potassium hydroxide solution and water. After evaporating the ether the crystals obtained are recrystallized first from diluted alcohol and then from acetone-water. A cholestadienon of the general formula $C_{27}H_{42}O$ is obtained in the form of white crossed leaflets which melt at 111–112°; the optical rotation amounts to $[\alpha]_D = +32.5°$ in chloroform; yield 3.5 g. From the mother liquor further amounts of the same compound can be isolated.

In order to obtain the cholestadienone quickly in a crystalline form it is advisable to distill the ether soluble dark colored oil obtained by treating the dibromocholestanone with pyridine, in a high vacuum: 4 g. of the oil are distilled at a temperature of 170–180° and a pressure of 0.0003 mm. Hg. The distillate is taken up with ether and recrystallized from dilute alcohol whereby the cholestadienone is likewise obtained in fine crystals. The melting point of this material, 106–108°, is somewhat lower than that of the product obtained by direct crystallization.

Example 6

46 g. dibromo-androstandione, obtainable by adding a solution of 11 ccs. of bromine (2 mols) in 100 ccs. of glacial acetic acid in small portions under constant stirring to a solution of 31 g. androstandione dissolved in a mixture of 1 litre chloroform and 200 ccs. glacial acetic acid and evaporating the reaction solution after washing with water and freeing from water in vacuum at 50° are treated with 500 ccs. of dry pyridine. The mixture is then boiled under reflux for four hours in a glycerol bath at a bath temperature of 135–140°. Thereupon the pyridine is evaporated in vacuum at 80° and the reaction product obtained treated with ether and water. The ethereal solution which is washed with water yields after evaporation of the solvent 5 g. of an oil from which the $\Delta_{1,2,4,5}$-androstadiendione-3,17 can be isolated, suitably by distillation in vacuum and crystallization from alcohol.

The pyridine compounds likewise formed dur ing the reaction and contained in the aqueous layer are extracted with cloroform in an extraction apparatus after the addition of sodium carbonate in order to neutralise the hydrobromic acid. Thereby a further 11 g. of a pyridyl-ketone are obtained.

EXAMPLE 7

2.8 g. 2,4-dibromocholestanone-3 are treated with 100 ccs. of glacial acetic acid; to the mixture a solution of 0.25 cc. of bromine (1 mol) in 25 ccs. of glacial acetic acid and 2 ccs. hydrobromic glacial acetic acid are added. Thereupon the reaction mixture is warmed for about half an hour at 90°. Decoloration slowly occurs whereupon the reaction mixture becomes darkly colored again on account of decomposition. The reaction mixture is then cooled to 0° and the crystallised product filtered off, washed with alcohol and recrystallised from chloroform-alcohol. The tribromocholestanone in the form of needles of M. P. about 176° (decomposition) is obtained.

3.2 g. tribromocholestanone (decomp. 176°) are boiled under reflux for five hours with 30 ccs. of dry pyridine. Thereupon the dark red colored solution is treated with ether whereby a pulverised mass is obtained. The pulverised material is filtered off from the dark red mother liquor and repeatedly washed with ether until the ether is no more colored. The product insoluble in ether is now taken up with chloroform and washed with water. The chloroform solution filtered off is evaporated whereby an unsaturated pyridine condensation product in the form of a purified oil is obtained; yield 1.5 g.

EXAMPLE 8

5 g. tribromide, obtained from cholesteroldibromide after oxidation and bromination, are dissolved in a little benzene and added to a boiling solution of 3 g. potassium acetate in 100 ccs. of absolute alcohol. A rapid precipitation of potassium bromide occurs. The solution is boiled for 10 minutes and simultaneously concentrated. The solution is diluted with water until the inorganic salts are dissolved and crystallisation of the enolacetate occurs. After cooling the mixture the crystals are filtered off and washed with alcohol; yield 3 g. of a nearly pure crude product.

By recrystallization from petroleumether the enolactetate is obtained in the form of fine needles of M. P. 158–159° with preliminary sintering. On slowly cooling the capillary tube an intensive coloration takes place which changes gradually from a light green to a dark blue. On crystallization the melted mass becomes colorless again. The procedure can be repeated. The compound is easily soluble in chloroform, benzene, warm petroleumether, insoluble in alcohol, methanol.

Saponification: 1.5 g. of the enolacetate are dissolved in 5 ccs. of benzene and to the solution added 50 ccs. of absolute alcohol and 3 ccs. of concentrated hydrochloric acid. The solution is boiled under reflux for 2½ hours and during 15 minutes concentrated until crystallization occurs. After cooling the crystals are filtered off and washed with alcohol; yield 1 g. of a nearly pure product. The compound crystallizes from chloroform-alcohol in fine needles of M. P. 160–161°.

EXAMPLE 9

To a solution of 0.75 g. of the cholestanonetribromide (M. P. 137–138°) in 15 ccs. of chloroform is added a cooled solution of 0.15 g. potassium acetate in 45 ccs. of absolute alcohol. After 15 hours standing at room temperature the solution, from which potassium bromide has been separated, is warmed to 40° for a further 10 minutes and then concentrated in vacuum at 35° until crystals appear. After adding some water to complete the separation of the bromide and the solution of the inorganic salts the crystals are filtered off and washed with alcohol. After recrystallization from chloroform-alcohol 0.3 g. crystals of M. P. 160–161° (decomp.) are obtained.

A solution of 0.3 g. of the dibromide in a little benzene is mixed with a boiling solution of 0.3 g. potassium acetate in 10 ccs. of absolute alcohol. After boiling for 15 minutes the solution is diluted with water as described above. After cooling 0.2 g. of the nearly pure enol-acetate can be filtered off. After recrystallization from petroleum ether the melting point is 157–159°.

By saponification according to the manner described in Example 8 the same unsaturated orthodiketone is obtained.

EXAMPLE 10

To a solution of 6 g. of cholestenone in 200 ccs. of ether is added at 2° under vigorous stirring a solution of 4.7 g. bromine (1.5 ccs., 2 mol) in 75 ccs. of glacial acetic acid. If the color of the bromine remains after the first few drops have been added, the reaction is started by addition of some drops of hydrobromic-glacial acetic acid. The adding of the bromine solution should last about 20 minutes. Thereupon the solution is freed from the ether in vacuum at 35° until the separation of the bromine product takes place. After allowing the bromide to stand for a short time in ice, it is filtered off and washed with alcohol.

For purifying, the product is dissolved in a little warm chloroform and to the solution several times the amount of alcohol is added. Crystallization rapidly occurs. On an average the yield amounts to 1.8 g.

The pure compound melts at 162° (decomp.). The conversion of the dibromide into the doubly unsaturated enolacetate of M. P. 158–159° by boiling with alcoholic potassium acetate solution is carried out exactly in the same manner as in Example 9.

From the main mother liquor after several days of standing a second, more easily soluble fraction precipitates on repeated careful dilutions with water. The M. P. of this fraction lies first at 120–122°. On repeated recyrstallizations from glacial acetic acid needles are isolated, M. P. of which lies at 133°. The analysis shows that this product has also the composition $C_{27}H_{42}OBr_2$ of the dibromide. The mixed melting point with the dibromide of M. P. 162° lies at 122–125°.

This product is possibly not yet quite pure but it is likely an isomer of the dibromide of M. P. 162°. The close relationship of the two dibromides follows from the fact that such a low melting product (M. P. 131°) is likewise converted into the enolacetate by boiling with alcoholic potassium acetate solution. A fraction melting still lower (M. P. 119°, obtained from alcohol), the mixed melting point of which with the preparation of M. P. 131° lies at 121-122°, yields likewise the enolacetate.

It seems likely that an isomeric dibromide exists and that this differs from the dibromide of M. P. 162° only by the steric position of the bromine atom at the carbon atom 6. The supposed course of the cholestenone-bromination makes it possible to foresee such an isomerism.

On saponification according to the manner described in the Examples 8 and 9 the enolacetate yields the singly unsaturated ortho-diketone.

The reactions occurring in the three foregoing examples can be illustrated by the following structural formulas:

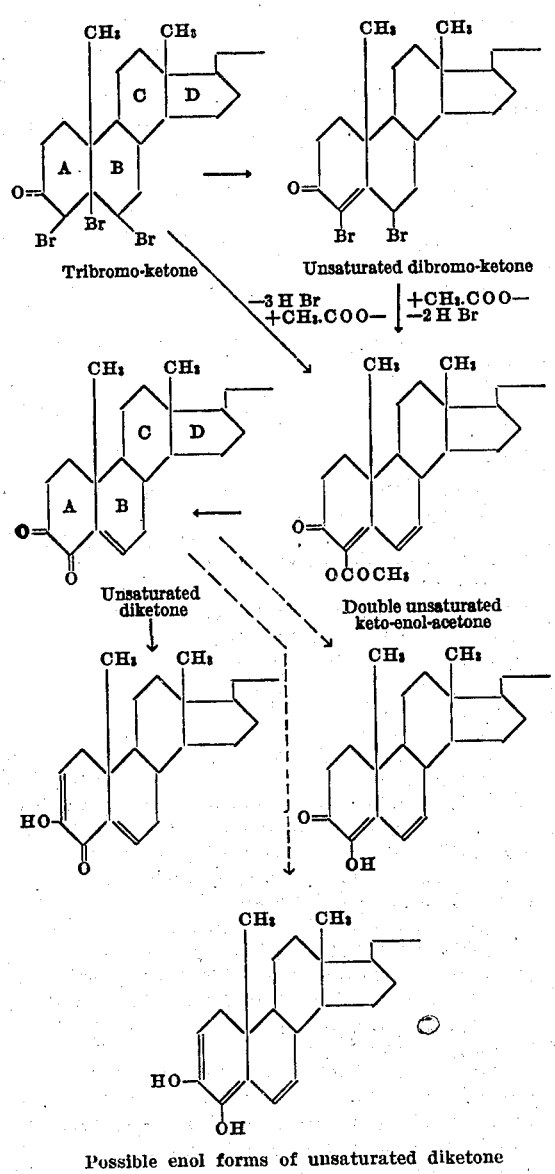

Possible enol forms of unsaturated diketone

EXAMPLE 11

1.3 g. 4,4,5,6-tetrabromocholestanone-3 are dissolved in 60 ccs. of butanol and mixed with 3 g. potassium acetate. The solution is heated to boiling in an oil bath for eight hours. Then the cooled solution is poured into water and extracted with ether. The ethereal solution is freed from water and evaporated under diminished pressure. The residue crystallises from alcohol and little acetone; the yield is 0.2 g. The $\Delta^{5,6}$-cholestendione-3,4 obtained, which has the composition $C_{27}H_{42}O_2$, is recrystallised under addition of charcoal from alcohol and diluted acetone. It is obtained in felted needles of M. P. 159°. It gives a violet colour with ferric chloride and decolorises chromic acetic acid solution within a few minutes.

EXAMPLE 12

1 g. 2,4-dibromocholestanone of M. P. 193-194° is dissolved in 50 ccs. of normal butanol mixed with 2.1 g. of waterfree potassium acetate and boiled for fifteen hours at a temperature of 135-140°. A white insoluble compound is separated which proves to be potassium bromide. The reaction mixture is poured into water, mixed with ether and repeatedly thoroughly washed with water. After evaporating the ether and the butanol a light colored oil remains. On sublimation in high vacuum a compound distills between 125-130°, which, after being twice crystallized from pure alcohol, is obtained in beautifully shaped needles of M. P. 148-149°. From the cholestandione obtained the corresponding enolacetate can be formed by the following manner:

22.5 mg. of cholestandione of the melting point 148-149° are mixed with 2 ccs. of a solution prepared from 1.2 ccs. of acetic acid anhydride and 8.8 ccs. of pyridine and allowed to stand at room temperature for sixteen hours. Thereupon the reaction mixture is poured into diluted sulphuric acid while cooling and extracted with ether. After freeing the ethereal solution from water and evaporating the ether the light colored oil which remains, is taken up with alcohol. A compound in the form of lustrous needles is obtained therefrom, which after having been recrystallized twice from diluted alcohol, melts at 100-101°.

A quinoxaline derivative can be prepared from the cholestandione as follows:

33 mg. of cholestandione of melting point of 148-149° are dissolved in 5 ccs. of absolute alcohol and mixed with 30 mg. ortho-phenylendiamine in 2 ccs. of absolute alcohol and 0.5 cc. of glacial acetic acid. The reaction mixture is boiled under reflux for six hours on the waterbath. After twelve hours of standing from the solution a compound crystallizes directly in lustrous long needles, which after repeated recrystallisation from pure acetone, melt at 207-208°. The reaction may be illustrated by the following structural formulas, which relate to the direct transformation of 2,4-dibromocholestanone-3 into 3,4-cholestandione, whereby the 2,3-cholestandione and the Δ1,2;4,5-cholestadienone-3 are formed simultaneously.

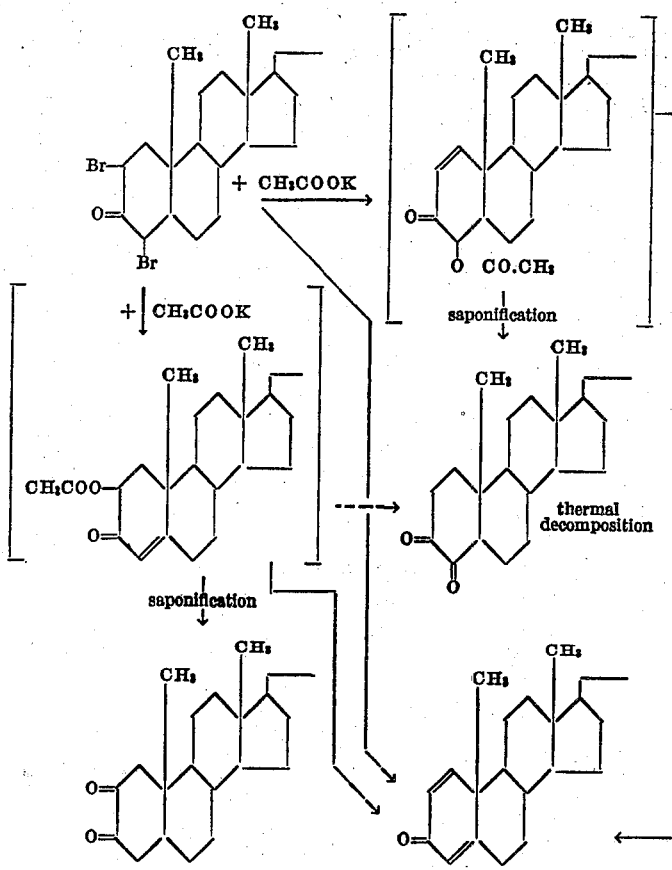

Example 13

1.6 g. cholesterol-hydrochloride are dissolved in 200 ccs. glacial acetic acid and 20 ccs. benzene. To the solution 0.8 g. chromic acid anhydride in 30 ccs. glacial acetic acid (corresponding to 3 atoms of oxygen) are added while cooling with ice. After allowing the reaction mixture to stand for twelve hours in the cold, 40 ccs. water are added whereupon the precipitate formed is filtered off and recrystallized from alcohol-acetone. The melting point lies between 102 and 135°.

0.96 g. of the chlorocholestanone obtained are dissolved in 150 ccs. glacial acetic acid and mixed with 1.44 ccs. of glacial acetic acid containing the amount of bromine corresponding to 1 mol of the chloro-ketone. The solution is decolorised after 5 minutes. After the addition of water the precipitate formed is filtered off and recrystallized from aqueous acetone. M. P. about 122°.

From this chlorobromo-cholestanone the 3,4-cholestandione as well as the 3,6-cholestandione can be obtained in the following manner:

(a) Production of 3,4-cholestandione 1.4 g. chlorobromo-cholestanone are heated with 45 ccs. of 21% solution of potassium acetate in glacial acetic acid within two hours to 160° and kept at this temperature for six hours. Thereupon the solution is filtered, mixed with water and extracted with ether. The ethereal solution is washed with alkali-hydroxide solution, freed from water and evaporated to dryness. The residue is mixed with alcohol and acetone, wherefrom after standing for some time crystals are obtained.

The reaction product is recrystallised from alcohol and diluted acetone, whereby feather-like crystals of M. P. 146–147° are obtained; the mixture of the same with cholestandione-3,4 obtained according to Example 14, gives no depression of the melting point.

(b) Production of 3,6-cholestandione 1.2 g. of chlorobromo-cholestanone are dissolved in 45 ccs. of 21% solution of potassium acetate in glacial acetic acid, slowly warmed to 220° within five hours and kept at this temperature for a further five hours. After cooling the solution is filtered, mixed with water and extracted with ether. Further working up is carried out as described above.

If the splitting off of halogen is effected at temperatures between 160–220°, a mixture of the two diketones is obtained, at comparatively low temperature more of the 3,4-diketone and at comparatively high temperature more of 3,6-diketone is formed.

The 3,4- and 3,6-cholestandiones referred to can also be obtained by producing first an α,β-unsaturated mono-bromide and converting the same into a diketone by treatment with potassium acetate in butanol.

The production of the intermediate product takes place as follows:

To 500 mg. chlorobromo-cholestanone, dissolved in a little benzene, a hot solution of 500 mg. potassium acetate in 25 ccs. alcohol is added. The mixture is refluxed for half an hour and concentrated during a further quarter of an hour. The hot solution is then mixed with water and the product precipitated is recrystallised from alcohol. Fine needles of M. P. 123° are obtained.

Instead of halogenated cholesterol compounds other halogenated steroids can likewise be used as starting materials, for instance the analogous pregnane- and androstane-compounds. From these compounds the corresponding diketones are obtained in an analogous manner.

The reaction may be illustrated by the following structural formulas:

Direct conversion of 4-bromo-5-chloro-cholestanone-3 into 3,4-cholestandione and 3,6-cholestandione resp. with the simultaneous formation of Δ1,2,4,5-cholestadienone-3:

which after recrystallization from acetic ester melts at 161–162° and has an optical rotation of +55.9° (in chloroform). From the main mother liquor, after evaporation of the petroleum ether and taking up of the residue in alcohol, the 3,4-cholestandione of M. P. 147–148° crystallizes out. The enol acetate of the 2,3-cholestandione is obtained with the aid of pyridine and acetic anhydride, and after recrystallization from ethanol melts at 142°. The enol benzoate of the 2,3-diketone is produced with pyridine and benzoyl chloride, and after recrystallization from methanol melts at 124–124.5°.

The reaction may be illustrated by the following structural formulas:

Two step process: Conversion of 2,4-dibromocholestanone-3 into the benzoate of the unsat-

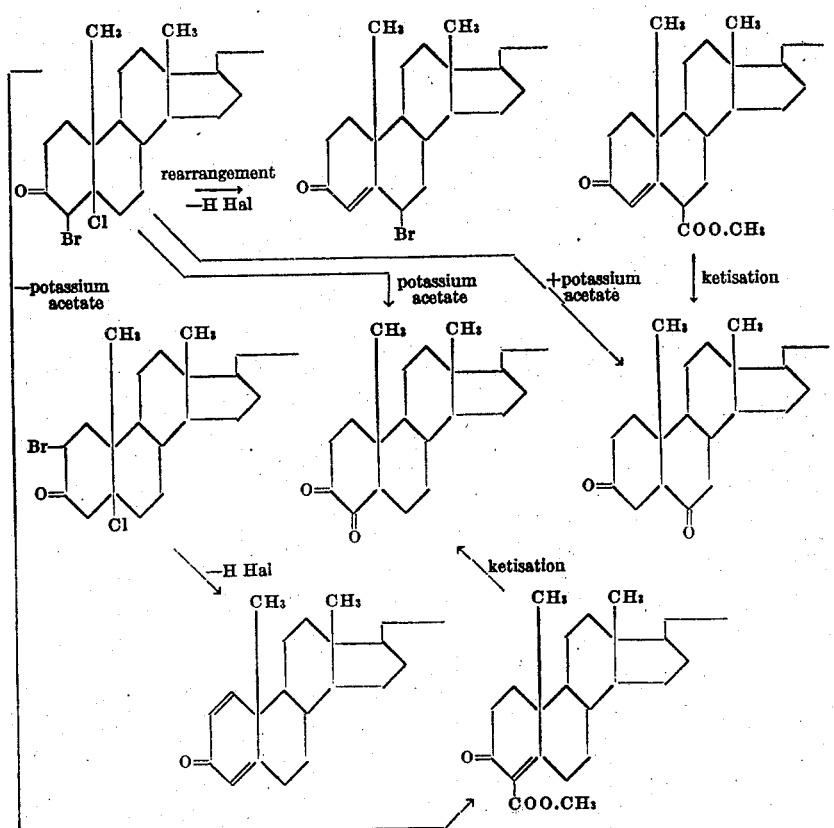

Example 14

2 g. of the benzoate of M. P. 176–177° as it can be obtained according to Example 1 are refluxed for two hours in a solution of 6 g. potassium hydroxide in 100 ccs. methyl alcohol. Thereupon the reaction solution is cooled, diluted with water and extracted with ether. After washing with water the ethereal solution is evaporated to dryness. On recrystallising from alcohol the residue yields the 3,4-cholestandione in the form of fine needles melting at 147–148°.

The isomeric benzoate of M. P. 137–138° on the same treatment yields the 2,3-cholestandione and likewise the 3,4-cholestandione of melting point 147–148°. By the alkaline saponification of the 2-benzoate of M. P. 137–138° there is obtained, when the neutral saponification product is dissolved in petroleum ether and the solution permitted to stand at 0°, the 2,3-cholestandione urated hydroxyl ketone with subsequent saponification into the enolic form of the 3,4-diketone.

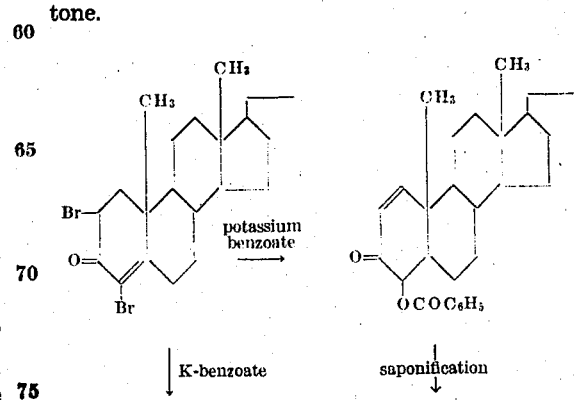

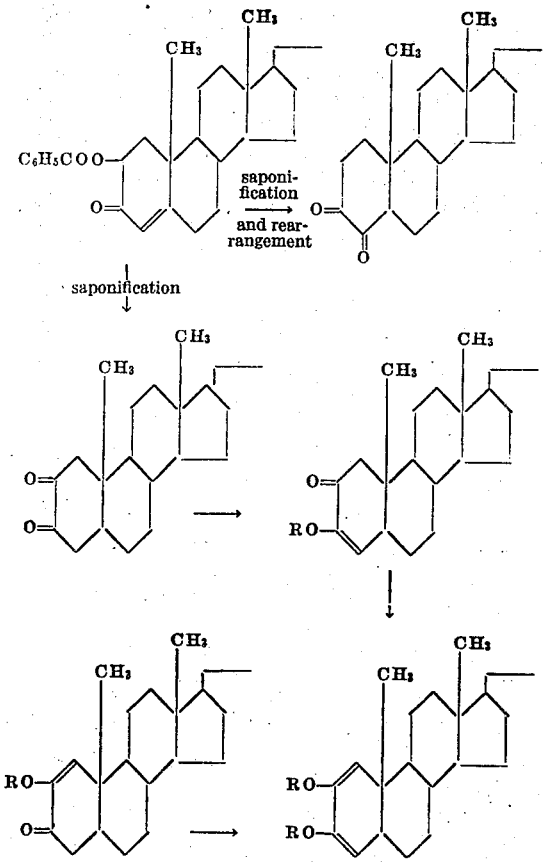

EXAMPLE 15

2.2 g. cholestenone-enol-acetate of M. P. 80–81° are dissolved in 75 ccs. ether and into the etheral solution while stirring a solution of 1.6 g. bromine in 25 ccs. glacial acetic acid (corresponding to about 2 mols bromine for 1 mol cholestenone-enol-acetate) is caused to drop within 10 minutes at a temperature of 2°; the bromine is taken up rapidly. Thereupon the solution is concentrated in vacuum at 35° until crystallisation occurs. The crystals are filtered off, washed with alcohol and recrystallised from chloroform alcohol. There are obtained about 1.0–1.5 gs. of the unsaturated dibromoketone of M. P. 162–163°, crystallising in the form of fine needles.

In an analogous manner, for instance from the enol benzoate of the androstendione (M. P. at 175–180° with decomposition) the corresponding unsaturated dibromo-ketone is obtained likewise.

EXAMPLE 16

A solution of 2 g. of cholestenone in 20 ccs. of chloroform is mixed with a solution of 1.12 ccs. of bromine (4 mols) in 28 ccs. of glacial acetic acid. After standing for fifteen hours the reaction mixture is concentrated in vacuum at low temperature. An oil separates which is mixed with crystals. After one recrystallization from ethylacetate and three recrystallisations from chloroform-acetic acid a bromine product of M. P. 183° is obtained. Its absorption maximum lies at 297 m$\mu$. The analysis corresponds to the formula $C_{27}H_{40}OBr_2$, M. P. 183°. This compound represents a $\Delta^{4,5;6,7}$-4,6-dibromocholestadienone-3.

EXAMPLE 17

A mixture of 5.3 ccs. of bromide (8 mols) are made up with glacial acetic acid to 50 ccs. and added in portions of 5 ccs. to a solution of 5 g. cholestenone in 100 ccs. of ether within 35 minutes. Thereupon the reaction mixture is mixed with 5 g. sodium acetate and allowed to stand for sixteen hours. After the bromine in excess has been eliminated by shaking with bisulphite solution the ethereal solution is washed with water, freed from water and evaporated. Thereby 1.4 g. of a compound containing bromine and crystallizing in form of leaflets are separated, M. P. about 188°. The bromide compound melts on rapid heating at 194°, on slow heating at 182°. By recrystallization from chloroform-glacial acetic acid the melting point cannot be raised any more. The analysis corresponds to the general formula $C_{27}H_{41}OBr_3$.

0.2 g. of this tribromide are mixed with 3 ccs. of ethylacetate and 1 cc. of hydrobromic glacial acetic acid solution. After the reaction mixture has been allowed to stand for three days, ether is added and the ethereal solution washed with water, freed from water and evaporated to dryness. The residue is recrystallized from chloroform-methanol, M. P. 143–144°. The crystals after having been recrystallized for a further three times show a constant melting point of 150°. After grinding up the white crystalline needles in an agate mortar, the melting point is raised to 177°. According to the procedure of this example the same halogenation product is obtained as according to Example 16.

In an analogous manner by halogenation of $\Delta^{4,5}$-unsaturated ketones of other steroids, for instance of androstan- and pregnan-ketones, such as progesterone, androstendione, testosterone and the like, containing 2 mols of bromine or more, the corresponding dihalogenated unsaturated ketones are finally obtained. By complete dehalogenation of these unsaturated polyhalogenated ketones, obtained according to the preceding example, more or less unsaturated or polyketo compounds are formed.

EXAMPLE 18

To a solution of 1 g. pregnenol-3-one-20 in 12 ccs. glacial acetic acid a solution of 0.16 cc. bromine in 2 ccs. glacial acetic acid (corresponding to 1 mol bromine for 1 mol pregnenolone) is added. The bromine is taken up rapidly whereupon to the reaction mixture a solution of 400 mg. chromic acid anhydride in a little water is added. After the mixture has been allowed to stand for 24 hours it is poured into water; the reaction product precipitated is filtered off and freed from the adherent mother liquor on porous porcelain. The dibromo-ketone obtained is then without being further purified dissolved in about 8 ccs. benzene, the solution, if necessary, is filtered and mixed with a solution of 1 g. potassium acetate in 20 ccs. alcohol. The mixture is boiled on the water bath in an open flask for 15 minutes whereby it is concentrated to large extent, most of the solvents being distilled off. After the alcoholic solution is diluted with water crystals are formed which are filtered off and washed with alcohol. The $\Delta_{4,5}$-6-bromopregnendione-3,20 melting at 137–138° (under decomp.) is obtained which can be further purified by recrystallization; yield 350 mg.

200 mg. $\Delta_{4,5}$-6-bromopregnendione-3,20 are dissolved in 3 ccs. of dry pyridine; the mixture is heated to boiling for 2½ hours whereupon the pyridine is evaporated in vacuum. The residue obtained is repeatedly extracted with ether, whereby only small amount of by-products are taken up with the solvent. The portion insoluble in ether is dissolved in chloroform. By washing this solution with water the water soluble pyridine compounds are removed.

The chloroform solution which contains the main portion of the reaction product is evaporated and the residue distilled in a high vacuum at 200° and at a pressure of 0.0003 mm. Hg. The distillate obtained crystallizes besides a red colored oil of white stout crystals which can be separated from the oil by treatment with ether, wherein they are not soluble. The crystals obtained by washing the distillate with ether consists of $\Delta_{4,5;6,7}$-pregnandiendione-3,20 melting at 140–141°; if desired, they can be further purified by recrystallization. The yield amounts to 12 mg.

Of course, various modifications and changes in the reaction conditions etc. may be made by those skilled in the art in accordance with the principles set forth herein and in the claims annexed hereto.

What we claim is:

1. Process for the production of valuable ketones of steroids and their enol derivatives respectively comprising subjecting ketones of steroids polyhalogenated in the ring system to the action of agents capable of splitting off halogen hydride.

2. Process according to claim 1 characterized in that for splitting off halogen hydride the salts of organic acids are used and that the dehalogenating treatment is carried out in the presence of compounds selected from the group consisting of solvents for the salts which boil at relatively high temperature and those acids the salts of which are used for splitting off halogen hydride.

3. Process according to claim 1 characterized in that for splitting off halogen hydride, nitrogen bases are used.

4. Process according to claim 1 characterized in that ketones of steroids polyhalogenated in the ring system are subjected in a neutral medium to the action of agents capable of splitting off halogen hydride and replacing halogen by an acyl radical, and isolating unsaturated steroids containing at least two keto groups in ortho-position in ring A.

5. Process for the production of unsaturated keto-steroids and their enolic derivatives, comprising subjecting steriod ketones tribrominated in the ring system, in a neutral medium, to the action of an agent capable of splitting off hydrogen bromide and replacing bromine with an acyl radical, and isolating an unsaturated steriod containing at least two keto groups in ortho-position in ring A.

6. Process for the production of plurally unsaturated keto-steroids and their enolic derivatives, comprising subjecting an unsaturated keto-steroid which is dibrominated in the ring system, in a neutral medium, to the action of an agent capable of splitting off hydrogen bromide and replacing bromine with an acyl radical, and isolating a plurally unsaturated steroid containing at least two keto groups in ortho-position in ring A.

7. Process for the production of valuable ketones of steruids and their enol derivatives comprising subjecting steroid ketones polyhalogenated in ring A and containing a keto group at the carbon atom 3 and at least one halogen atom at the carbon atom 2 to the action of an agent capable of splitting off halogen and introducing two carbon-to-carbon double bonds into ring A, and isolating the compounds containing a keto group at the carbon atom 3 and two carbon-to-carbon double bonds in ring A and their enol derivatives.

8. Process according to claim 1 characterized in that steroid ketones poly-halogenated in ring A and containing a keto group at the carbon atom 3 and at least one halogen atom at the carbon atom 2 are subjected to the action of an agent capable of replacing halogen with a member of the class consisting of hydroxy, ester and ether groups to introduce two carbon-to-carbon double bonds into ring A, whereupon a compound selected from the group consisting of the corresponding acid and alcohol is split off.

9. Process according to claim 1 characterized in that steroid ketones poly-halogenated in ring A and containing a keto group at the carbon atom 3 and at least one halogen atom at the carbon atom 2 are subjected to the action of an agent capable of replacing halogen with a member of the class consisting of hydroxy, ester and ether groups to introduce two carbon-to-carbon double bonds into ring A, whereupon a compound selected from the group consisting of the corresponding acid and alcohol is split off, and introducing into the enol derivatives obtained, further carbon-to-carbon double bonds in ring A by the corresponding treatment.

10. Process according to claim 7, wherein the carbon-to-carbon double bonds are introduced into ring A by treatment with a salt of an organic acid.

11. Process according to claim 7, wherein the carbon-to-carbon double bonds are introduced into ring A by treatment with a salt of an organic acid in the presence of the free acid itself.

12. Process according to claim 7, wherein the carbon-to-carbon double bonds are introduced into ring A by treatment with a salt of an organic acid, and thereafter heating the reaction product to remove ester groups formed.

13. Process according to claim 7, wherein the carbon-to-carbon double bonds are introduced into ring A by treatment with a salt of an organic acid in the presence of a high boiling solvent.

14. Process for the production of steroid ketones containing a keto group at the carbon atom 3 and two carbon-to-carbon double bonds in ring A and their enol derivatives, respectively, characterized in that steroid ketones poly-halogenated in ring A and containing a keto group at the carbon atom 3 and at least one halogen atom at the carbon atom 2 are subjected to the action of a basic agent to effect splitting off of halogen.

15. Process according to claim 13, wherein the basic agent is a basic nitrogen compound.

16. Process according to claim 13, including the step of splitting off the basic agent where the same becomes joined to the starting compound.

17. Process according to claim 7, including the step of subjecting the doubly unsaturated ketone reaction product to the action of an agent capable of enolizing the ketone and simultaneously forming stable enol derivatives thereof.

18. In a process for producing stable enol derivatives of unsaturated steroid ketones having a keto group at the carbon atom 3 and two double bonds in ring A, the step which comprises subjecting such ketones to the action of an agent capable of enolizing said ketones.

19. Process according to claim 1 characterized in that polyhalogenated 3-keto-compounds of the androstane series of the structural formula

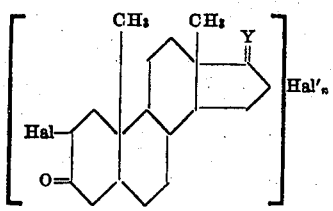

wherein Hal for a halogen atom, Hal'$_n$ for halogen in ring A or in rings A and B, $n$ being a whole number from 1 to 3, and Y for a member of the group consisting of

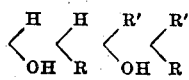

R representing a group convertible into the hydroxy group by hydrolysis and R' indicating a hydro-carbon radical, are subjected to the action of an agent capable of introducing two carbon-to-carbon double bonds into ring A by splitting off halogen atoms, and isolating unsaturated ketones of the androstane-series containing 2 double bonds in ring A and their enol derivatives.

20. Process for the production of keto compounds of the androstane series containing two carbon-to-carbon double bonds in ring A and their enol derivatives, respectively, according to claim 1 characterized in using as starting materials polyhalogenated 3,17-diketones of the androstane series which contain a halogen atom at the carbon atom 2 and a further halogen atom at at least one of the carbon atoms 2, 4 and 5.

21. Process for the production of valuable steroid compounds including the steps of subjecting polyhalogenated steroid ketones to the action of a basic nitrogen compound.

22. Unsaturated steroid ketones containing a keto group at the carbon atom 3 and two carbon to carbon double bonds in ring A.

23. $\Delta_{1,2;4,5}$-cholestadienone-3.

24. $\Delta_{1,2;4,5}$-androstadiendione-3,17.

25. $\Delta_{1,2;4,5}$-androstadienone-3.

26. Cholestadienone of M. P. 111–112° C.

27. Process for the production of unsaturated ketones of the cholestane series containing two double bonds in ring A and their enol derivatives, comprising subjecting polyhalogenated 3-keto compounds of the colestane series to the action of an agent capable of splitting off halogen atoms and thereby introducing double bonds into ring A.

28. Process according to claim 7, wherein the starting compound belongs to the cholestane series, said process including the step of subjecting the doubly unsaturated ketone reaction product to the action of an agent capable of enolizing the ketone and simultaneously forming stable enol derivatives thereof.

HANS HERLOFF INHOFFEN.
ADOLF BUTENANDT.
ERWIN SCHWENK.

Certificate of Correction

Patent No. 2,340,388.  February 1, 1944.

HANS HERLOFF INHOFFEN ET AL.

It is hereby certified that errors appear in the printed specification of the above numbered patent requiring correction as follows: Page 1, first column, last formula therein should appear as shown below instead of as in the patent—

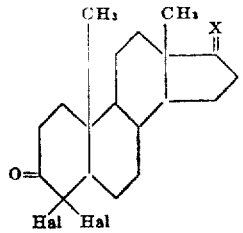

and the second column, last formula therein should appear as

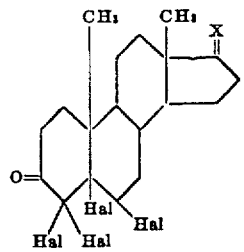

Page 2, second column, lines 34 to 44 inclusive, the left-hand formula should appear as

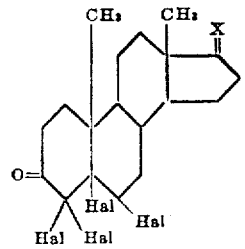

Page 9, first column, lines 46 and 47, for "Double unsaturated keto-enol-acetone" read *Double unsaturated keto-enol-acetate*; and that the said Letters Patent should be read with these corrections therein that the same may conform to the record of the case in the Patent Office.

Signed and sealed this 26th day of October, A. D. 1948.

[SEAL]

THOMAS F. MURPHY,
*Assistant Commissioner of Patents.*